United States Patent
Su et al.

(10) Patent No.: US 8,811,490 B2
(45) Date of Patent: Aug. 19, 2014

(54) MULTIPLE COLOR CHANNEL MULTIPLE REGRESSION PREDICTOR

(75) Inventors: Guan-Ming Su, Fremont, CA (US); Sheng Qu, San Jose, CA (US); Hubert Koepfer, Milpitas, CA (US); Yufei Yuan, Austin, TX (US); Samir Hulyalkar, Los Gatos, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/110,694

(22) PCT Filed: Apr. 13, 2012

(86) PCT No.: PCT/US2012/033605
§ 371 (c)(1),
(2), (4) Date: Oct. 8, 2013

(87) PCT Pub. No.: WO2012/142471
PCT Pub. Date: Oct. 18, 2012

(65) Prior Publication Data
US 2014/0029675 A1 Jan. 30, 2014

Related U.S. Application Data

(60) Provisional application No. 61/475,359, filed on Apr. 14, 2011.

(51) Int. Cl.
*H04N 7/26* (2006.01)
(52) U.S. Cl.
CPC ... *H04N 19/00981* (2013.01); *H04N 19/00357* (2013.01); *H04N 19/00424* (2013.01); *H04N 19/00175* (2013.01); *H04N 19/00024* (2013.01)
USPC ............ 375/240.16; 375/240.12; 375/240.24; 382/166; 382/167; 382/232; 382/238; 382/274

(58) Field of Classification Search
CPC .......................... H04N 7/26; H04N 19/00448
USPC .............................. 375/240.16; 382/167, 274
See application file for complete search history.

(56) References Cited

U.S. PATENT DOCUMENTS

| 6,771,311 B1 | 8/2004 | Weldy |
| 7,035,460 B2 | 4/2006 | Gallagher et al. |

(Continued)

FOREIGN PATENT DOCUMENTS

| EP | 2009921 | 12/2008 |
| EP | 2144444 | 1/2010 |

(Continued)

OTHER PUBLICATIONS

Mantiuk, R., et al., "Backward Compatible High Dynamic Range MPEG Video Compression," ACM Transactions on Graphics, Jul. 2006.

(Continued)

*Primary Examiner* — Jay Patel
*Assistant Examiner* — Neil Mikeska
(74) *Attorney, Agent, or Firm* — Steinfl & Bruno LLP

(57) ABSTRACT

Inter-color image prediction is based on multi-channel multiple regression (MMR) models. Image prediction is applied to the efficient coding of images and video signals of high dynamic range. MMR models may include first order parameters, second order parameters, and cross-pixel parameters. MMR models using extension parameters incorporating neighbor pixel relations are also presented. Using minimum means-square error criteria, closed form solutions for the prediction parameters are presented for a variety of MMR models.

20 Claims, 3 Drawing Sheets

(56) References Cited

U.S. PATENT DOCUMENTS

| | | | |
|---|---|---|---|
| 7,149,262 | B1 | 12/2006 | Nayar et al. |
| 7,403,565 | B2 | 7/2008 | Reitmeier et al. |
| 7,495,699 | B2 | 2/2009 | Nayar et al. |
| 7,737,930 | B2 | 6/2010 | Inuzuka et al. |
| 7,747,098 | B2 | 6/2010 | Ward |
| 7,760,949 | B2 | 7/2010 | Segall |
| 7,826,673 | B2 | 11/2010 | Segall |
| 8,249,337 | B2 | 8/2012 | Whitehead |
| 8,289,412 | B2 | 10/2012 | Banterle |
| 8,290,295 | B2 * | 10/2012 | Criminisi et al. ............ 382/274 |
| 8,514,934 | B2 | 8/2013 | Ward |
| 8,537,893 | B2 | 9/2013 | Efremov |
| 8,611,655 | B2 * | 12/2013 | Bryant et al. ................. 382/167 |
| 2006/0104533 | A1 | 5/2006 | Daly |
| 2007/0177175 | A1 * | 8/2007 | Matsuoka ...................... 358/1.9 |
| 2007/0201560 | A1 | 8/2007 | Segall |
| 2008/0175494 | A1 | 7/2008 | Segall |
| 2008/0175496 | A1 | 7/2008 | Segall |
| 2008/0175497 | A1 | 7/2008 | Segall |
| 2008/0253672 | A1 | 10/2008 | Segall |
| 2009/0003718 | A1 | 1/2009 | Liu |
| 2009/0046207 | A1 | 2/2009 | Salvucci |
| 2009/0074060 | A1 | 3/2009 | Kim |
| 2009/0097561 | A1 | 4/2009 | Chiu |
| 2009/0110054 | A1 | 4/2009 | Kim |
| 2009/0257652 | A1 | 10/2009 | Liu |
| 2009/0310015 | A1 | 12/2009 | El-Mahdy |
| 2010/0020866 | A1 | 1/2010 | Marpe |
| 2010/0183071 | A1 | 7/2010 | Segall |
| 2010/0208810 | A1 | 8/2010 | Yin |
| 2010/0220796 | A1 | 9/2010 | Yin |
| 2010/0239162 | A1 * | 9/2010 | Monga et al. ................. 382/167 |
| 2010/0260260 | A1 | 10/2010 | Wiegand |
| 2010/0272185 | A1 | 10/2010 | Gao |
| 2011/0129147 | A1 * | 6/2011 | Monga et al. ................. 382/167 |
| 2011/0157212 | A1 * | 6/2011 | Zhang et al. .................. 345/590 |
| 2011/0194618 | A1 | 8/2011 | Gish |
| 2011/0243232 | A1 * | 10/2011 | Alshina et al. ........... 375/240.16 |
| 2011/0316973 | A1 | 12/2011 | Miller |
| 2013/0148029 | A1 | 6/2013 | Gish |
| 2013/0287308 | A1 * | 10/2013 | Salvucci ....................... 382/232 |
| 2013/0294689 | A1 * | 11/2013 | Jia et al. ........................ 382/166 |

FOREIGN PATENT DOCUMENTS

| | | |
|---|---|---|
| WO | 2008/049445 | 5/2008 |
| WO | 2008/128898 | 10/2008 |
| WO | 2009/120928 | 10/2009 |
| WO | 2009/127231 | 10/2009 |
| WO | 2010/043922 | 4/2010 |

OTHER PUBLICATIONS

Mantiuk, R., et al., "High Dynamic Range Image and Video Compression—Fidelity Matching Human Visual Performance," IEEE International Conference on Image Processing, 2007.

Segall, A., "Scalable Coding of High Dynamic Range Video," IEEE International Conference on Image Processing, ICIP, 2007.

Ward, G., "A General Approach to Backwards-Compatible Delivery of High Dynamic Range Images and Video," IS and T/SID Color Imaging Conference, 2006.

Ward, G., "JPEG-HDR: A Backwards-Compatible, High-Dynamic Range Extension to JPEG," 13th Color Imaging Conference, 2005.

Mai, Z. et al, "On-the-Fly Tone Mapping for Backward-Compatible High Dynamic Range Image/Video Compression," IEEE International Symposium on Circuits and Systems: Nano-Bio Circuit Fabrics and Systems, 2010.

El Mahdy, H. et al., "High-Quality HDR Rendering Technologies for Emerging Applications," IBM Journal of Research and Development, 2010.

Liu, S. et al. "Bit-Depth Scalable Coding for High Dynamic Range Video" Proc. of SPIE Conference on Visual Communications and Image Processing, 2008.

Gao, Y. et al. "H.264/Advanced Video Coding (AVC) Backward-Compatible Bit-Depth Scalable Coding", IEEE Trans. on Circuits and Systems for Video Technology, vol. 19, No. 4, Apr. 2009, pp. 500-510.

Winken, M. et al. "Bit-Depth Scalable Video Coding", IEEE International Conference on Image Processsing, 2007.

Yu, Y. et al, "Improving Compression Performance in Bit Depth SVC with a Prediction Filter", Joint Video Team of ISO/IEC MPEG & ITU-T VCEG, Jan. 2008.

Sharma, G. et al. "Digital Color Imaging Handbook" published on Dec. 23, 2002.

* cited by examiner

MULTIPLE COLOR CHANNEL MULTIPLE REGRESSION PREDICTOR

CROSS-REFERENCE TO RELATED APPLICATIONS

This application claims priority to U.S. Provisional Patent Application No. 61/475,359 filed on 14 Apr. 2011, which is incorporated herein by reference in its entirety.

This application is also related to U.S. Provisional Patent Application No. 61/475,372 filed on 14 Apr. 2011, which is incorporated herein by reference in its entirety.

TECHNOLOGY

The present invention relates generally to images. More particularly, an embodiment of the present invention relates to a multiple color channel, multiple regression predictor between high dynamic range images and standard dynamic range images.

BACKGROUND

As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal vision (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'visual dynamic range' or 'variable dynamic range' (VDR) may individually or interchangeably relate to the DR that is simultaneously perceivable by a HVS. As used herein, VDR may relate to a DR that spans 5-6 orders of magnitude. Thus while perhaps somewhat narrower in relation to true scene referred HDR, VDR nonetheless represents a wide DR breadth. As used herein, the term 'simultaneous dynamic range' may relate to VDR.

Until fairly recently, displays have had a significantly narrower DR than HDR or VDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR), also referred to as a standard dynamic range (SDR), in relation to VDR and HDR.

Advances in their underlying technology however allow more modern display designs to render image and video content with significant improvements in various quality characteristics over the same content, as rendered on less modern displays. For example, more modern display devices may be capable of rendering high definition (HD) content and/or content that may be scaled according to various display capabilities such as an image scaler. Moreover, some more modern displays are capable of rendering content with a DR that is higher than the SDR of conventional displays.

For example, some modern LCD displays have a backlight unit (BLU) that comprises a light emitting diode (LED) array. The LEDs of the BLU array may be modulated separately from modulation of the polarization states of the active LCD elements. This dual modulation approach is extensible (e.g., to N-modulation layers wherein N comprises an integer greater than two), such as with controllable intervening layers between the BLU array and the LCD screen elements. Their LED array based BLUs and dual (or N-) modulation effectively increases the display referred DR of LCD monitors that have such features.

Such "HDR displays" as they are often called (although actually, their capabilities may more closely approximate the range of VDR) and the DR extension of which they are capable, in relation to conventional SDR displays represent a significant advance in the ability to display images, video content and other visual information. The color gamut that such an HDR display may render may also significantly exceed the color gamut of more conventional displays, even to the point of capably rendering a wide color gamut (WCG). Scene related HDR or VDR and WCG image content, such as may be generated by "next generation" movie and TV cameras, may now be more faithfully and effectively displayed with the "HDR" displays (hereinafter referred to as 'HDR displays').

As with the scalable video coding and HDTV technologies, extending image DR typically involves a bifurcate approach. For example, scene referred HDR content that is captured with a modern HDR capable camera may be used to generate an SDR version of the content, which may be displayed on conventional SDR displays. In one approach, generating the SDR version from the captured VDR version may involve applying a global tone mapping operator (TMO) to intensity (e.g., luminance, luma) related pixel values in the HDR content. In a second approach, as described in International Patent Application No. PCT/US2011/048861 filed 23 Aug. 2011, herein incorporated by reference for all purposes, generating an SDR image may involve applying an invertible operator (or predictor) on the VDR data. To conserve bandwidth or for other considerations, transmission of the actual captured VDR content may not be a best approach.

Thus, an inverse tone mapping operator (iTMO), inverted in relation to the original TMO, or an inverse operator in relation to the original predictor, may be applied to the SDR content version that was generated, which allows a version of the VDR content to be predicted. The predicted VDR content version may be compared to originally captured HDR content. For example, subtracting the predicted VDR version from the original VDR version may generate a residual image. An encoder may send the generated SDR content as a base layer (BL), and package the generated SDR content version, any residual image, and the iTMO or other predictors as an enhancement layer (EL) or as metadata.

Sending the EL and metadata, with its SDR content, residual and predictors, in a bitstream typically consumes less bandwidth than would be consumed in sending both the HDR and SDR contents directly into the bitstream. Compatible decoders that receive the bitstream sent by the encoder may decode and render the SDR on conventional displays. Compatible decoders however may also use the residual image, the iTMO predictors, or the metadata to compute a predicted version of the HDR content therefrom, for use on more capable displays. It is the purpose of this invention to provide novel methods for generating predictors that allow for the efficient coding, transmission, and decoding of VDR data using corresponding SDR data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Inter-color image prediction based on multivariate multi-regression modeling is described herein. Given a pair of corresponding VDR and SDR images, that is, images that represent the same scene but at different levels of dynamic range, this section describes methods that allow an encoder to approximate the VDR image in terms of the SDR image and a multivariate multi-regression (MMR) predictor. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to coding images with high dynamic range. An embodiment creates an MMR predictor that allows a VDR image to be expressed in relation to its corresponding SDR representation.

Example VDR-SDR System

Figure 1:
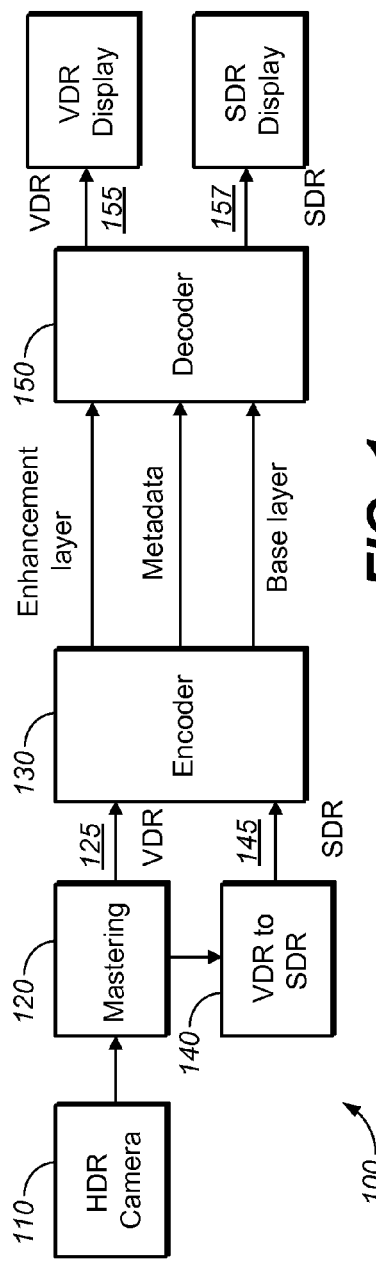
FIG. 1 depicts an example data flow for a VDR-SDR system, according to an embodiment of the present invention.

FIG. 1 depicts an example data flow in a VDR-SDR system 100, according to an embodiment of the present invention. An HDR image or video sequence is captured using HDR camera 110. Following capture, the captured image or video is processed by a mastering process to create a target VDR image 125. The mastering process may incorporate a variety of processing steps, such as: editing, primary and secondary color correction, color transformation, and noise filtering. The VDR output 125 of this process represents the director's intend on how the captured image will be displayed on a target VDR display.

The mastering process may also output a corresponding SDR image 145, representing the director's intend on how the captured image will be displayed on a legacy SDR display. The SDR output 145 may be provided directly from mastering circuit 120 or it may be generated with a separate VDR-to-SDR converter 140.

In this example embodiment, the VDR 125 and SDR 145 signals are input into an encoder 130. Purpose of encoder 130 is to create a coded bitstream that reduces the bandwidth required to transmit the VDR and SDR signals, but also allows a corresponding decoder 150 to decode and render either the SDR or VDR signals. In an example implementation, encoder 130 may be a layered encoder, such as one of those defined by the MPEG-2 and H.264 coding standards, which represents its output as a base layer, an optional enhancement layer, and metadata. As used herein, the term "metadata" relates to any auxiliary information that is transmitted as part of the coded bitstream and assists a decoder to render a decoded image. Such metadata may include, but are not limited to, such data as: color space or gamut information, dynamic range information, tone mapping information, or MMR predictor operators, such as those described herein.

On the receiver, a decoder 150, uses the received coded bitstreams and metadata to render either an SDR image or a VDR image, according to the capabilities of the target display. For example, an SDR display may use only the base layer and the metadata to render an SDR image. In contrast, a VDR display may use information from all input layers and the metadata to render a VDR signal.

Figure 2:
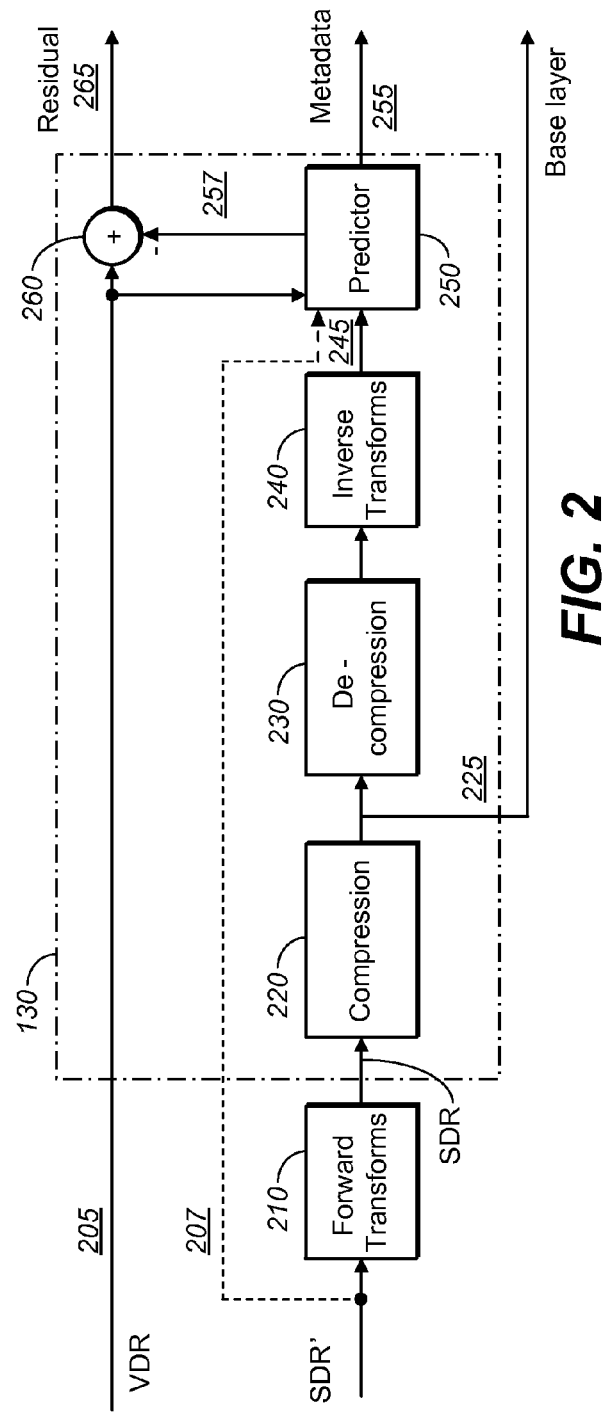
FIG. 2 depicts an example VDR encoding system according to an embodiment of the present invention.

FIG. 2 shows in more detail an example implementation of encoder 130 incorporating the methods of this invention. In FIG. 2, SDR' denotes an enhanced SDR signal. SDR video today is 8-bit, 4:2:0, ITU Rec. 709 data. SDR' may have the same color space (primaries and white point) as SDR, but may use high precision, say 12-bits per pixel, with all color components at full spatial resolution (e.g., 4:4:4 RGB). From FIG. 2, SDR can easily be derived from an SDR' signal using a set of forward transforms that may include quantization from say 12 bits per pixel to 8 bits per pixel, color transformation, say from RGB to YUV, and color subsampling, say from 4:4:4 to 4:2:0. The SDR output of converter 210 is applied to compression system 220. Depending on the application, compression system 220 can be either lossy, such as H.264 or MPEG-2, or lossless. The output of the compression system 220 may be transmitted as a base layer 225. To reduce drift between the encoded and decoded signals, it is not uncommon for encoder 130 to follow compression process 220 with a corresponding decompression process 230 and inverse transforms 240, corresponding to the forward transforms of 210. Thus, predictor 250 may have the following inputs: VDR input 205 and either SDR' signal 245, which corresponds to the SDR' signal as it will be received by a corresponding decoder, or input SDR' 207. Predictor 250, using input VDR and SDR' data will create signal 257 which represents an approximation or estimate of input VDR 205. Adder 260, subtracts the predicted VDR 257 from the original VDR 205 to form output residual signal 265. Subsequently (not shown), residual 265 may also be coded by another lossy or lossless encoder, and may be transmitted to the decoder as an enhancement layer.

Predictor 250 may also provide the prediction parameters being used in the prediction process as metadata 255. Since prediction parameters may change during the encoding process, for example, on a frame by frame basis, or on a scene by scene basis, these metadata may be transmitted to the decoder as part of the data that also include the base layer and the enhancement layer.

Since both VDR 205 and SDR' 207 represent the same scene, but are targeting different displays with different characteristics, such as dynamic range and color gamut, it is expected that there is a very close correlation between these two signals. In an example embodiment of this invention a novel multivariate, multi-regression (MMR) predictor 250 is developed that allows the input VDR signal to be predicted using its corresponding SDR' signal and a multivariate MMR operator.

Example Prediction Models

Figure 3:
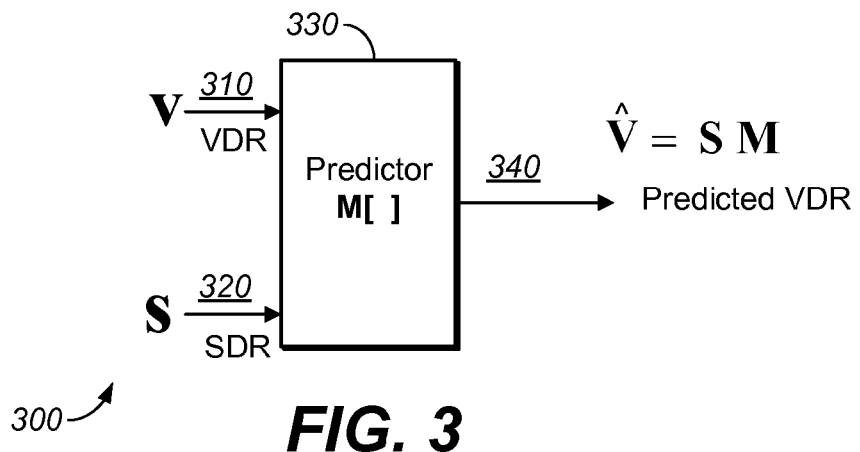
FIG. 3 depicts input and output interfaces of a multivariate multi-regression predictor, according to an embodiment of the present invention.

FIG. 3 shows input and output interfaces of an MMR predictor 300 according to an example implementation of this invention. From FIG. 3, predictor 330 receives input vectors v 310 and s 320, representing VDR and SDR image data respectively, and outputs vector $\hat{v}$ 340, representing the predicted value of input v.

Example Notation and Nomenclature

Denote the three color components of the i-th pixel in the SDR image 320 as $$s_i = [s_{i1} s_{i2} s_{i3}]. \quad (1)$$

Denote the three color components of the i-th pixel in the VDR input 310 as $$v_i = [v_{i1} v_{i2} v_{i3}]. \quad (2)$$

Denote the predicted three color components of the i-th pixel in predicted VDR 340 as $$\hat{v}_i = [\hat{v}_{i1} \hat{v}_{i2} \hat{v}_{i3}]. \quad (3)$$

Denote the total number of pixels in one color component as p.

In equations (1-3), color pixels may be in RGB, YUV, YCbCr, XYZ, or any other color representation. While equations (1-3) assume a three-color representation for each pixel in an image or video frame, as also shown later, the methods described herein can be easily extended to image and video representations with more than three color components per pixel, or to image representation where one of the inputs may have pixels with a different number of color representations than the other input.

First Order Model (MMR-1)

Using a Multivariate Multiple Regression (MMR) model, the first order prediction model can be expressed as:

$$\hat{v}_i = s_i \tilde{M}^{(1)} + n, \quad (4)$$

where $\tilde{M}^{(1)}$ is a 3×3 matrix and n is a 1×3 vector defined as:

$$\tilde{M}^{(1)} = \begin{bmatrix} m_{11}^{(1)} & m_{12}^{(1)} & m_{13}^{(1)} \\ m_{21}^{(1)} & m_{22}^{(1)} & m_{23}^{(1)} \\ m_{31}^{(1)} & m_{32}^{(1)} & m_{33}^{(1)} \end{bmatrix} \text{ and} \quad (5)$$

$$n = [n_{11} \; n_{12} \; n_{13}].$$

Note that this is a multiple color channel prediction model. In $\hat{v}_i$ of equation (4), each color component is expressed as a linear combination of all color components in the input. In other words, unlike other single-channel color predictors, where each color channel is processed on its own and independently of each other, for each output pixel, this model takes into consideration all color components of a pixel and thus takes full advantage of any inter-color correlation and redundancy.

Equation (4) can be simplified by using a single matrix-based expression:

$$\hat{v}_i = s_i' M^{(1)}, \quad (6)$$

where $$M^{(1)} = \begin{bmatrix} n_{11} & n_{12} & n_{13} \\ m_{11}^{(1)} & m_{12}^{(1)} & m_{13}^{(1)} \\ m_{21}^{(1)} & m_{22}^{(1)} & m_{23}^{(1)} \\ m_{31}^{(1)} & m_{32}^{(1)} & m_{33}^{(1)} \end{bmatrix}, \text{ and} \quad (7)$$

$$s_i' = [1 \; s_{i1} \; s_{i2} \; s_{i3}]$$

By collecting all p pixels of a frame (or other suitable slice or partition of an input) together, one may have the following matrix expression, $$\hat{V} = S' M^{(1)}, \quad (8)$$

where $$S' = \begin{bmatrix} s_0' \\ s_1' \\ \vdots \\ s_{p-1}' \end{bmatrix}, \text{ and } \hat{V} = \begin{bmatrix} \hat{v}_0 \\ \hat{v}_1 \\ \vdots \\ \hat{v}_{p-1} \end{bmatrix}, \quad (9)$$

represent the input and predicted output data, S' is a p×4 data matrix, $\hat{V}$ is a p×3 matrix, and $M^{(1)}$ is a 4×3 matrix. As used herein, $M^{(1)}$ may be referred to, interchangeably, as a multivariate operator or as a prediction matrix.

Based on this linear system of equations (8), one can formulate this MMR system as two different problems: (a) a least squares problem, or (b) a total least squares problem; both of which can be solved using well known numerical methods. For example, using a least squares approach, the problem of solving for M can be formulated as minimizing the residual or prediction mean squares error, or $$\min_{M^{(1)}} \|V - \hat{V}\|^2, \quad (10)$$

where V is a p×3 matrix formed using the corresponding VDR input data.

Given equations (8) and (10), the optimal solution for $M^{(1)}$ is given by $$M^{(1)} = (S'^T S')^{-1} S'^T V, \quad (11)$$

where, $S'^T$ denotes the transpose of S', and $S'^T S'$ is a 4×4 matrix.

If S' has full column rank, e.g., $$\text{rank}(S') = 4 \leq p,$$

then $M^{(1)}$ can also be solved using a variety of alternative numerical techniques, including SVD, QR, or LU decompositions.

Second Order Model (MMR-2)

Equation (4) represents a first order MMR prediction model. One can also consider adopting a higher order of prediction as described next.

The second order prediction MMR model can be expressed as:

$$\hat{v}_i = s_i^2 \tilde{M}^{(2)} + s_i \tilde{M}^{(1)} + n \qquad (12)$$

where $\tilde{M}^{(2)}$ is a 3×3 matrix, $$\tilde{M}^{(2)} = \begin{bmatrix} m_{11}^{(2)} & m_{12}^{(2)} & m_{13}^{(2)} \\ m_{21}^{(2)} & m_{22}^{(2)} & m_{23}^{(2)} \\ m_{31}^{(2)} & m_{32}^{(2)} & m_{33}^{(2)} \end{bmatrix}, \text{ and} \qquad (13)$$

$$s_i^2 = [\, s_{i1}^2 \quad s_{i2}^2 \quad s_{i3}^2 \,].$$

Equation (12) can be simplified by using a single prediction matrix, $$\hat{v}_i = s_i^{(2)} M^{(2)}, \qquad (14)$$

where $$M^{(2)} = \begin{bmatrix} M^{(1)} \\ \tilde{M}^{(2)} \end{bmatrix} = \begin{bmatrix} n_{11} & n_{12} & n_{13} \\ m_{11}^{(1)} & m_{12}^{(1)} & m_{13}^{(1)} \\ m_{21}^{(1)} & m_{22}^{(1)} & m_{23}^{(1)} \\ m_{31}^{(1)} & m_{32}^{(1)} & m_{33}^{(1)} \\ m_{11}^{(2)} & m_{12}^{(2)} & m_{13}^{(2)} \\ m_{21}^{(2)} & m_{22}^{(2)} & m_{23}^{(2)} \\ m_{31}^{(2)} & m_{32}^{(2)} & m_{33}^{(2)} \end{bmatrix}, \text{ and} \qquad (15)$$

$$s_i^{(2)} = \lfloor\, 1 \quad s_{i1} \quad s_{i2} \quad s_{i3} \quad s_{i1}^2 \quad s_{i2}^2 \quad s_{i3}^2 \,\rfloor. \qquad (16)$$

By collecting all p pixels together, one may define the following matrix expression:

$$\hat{V} = S^{(2)} M^{(2)}, \qquad (17)$$

where $$S^{(2)} = \begin{bmatrix} s_0^{(2)} \\ s_1^{(2)} \\ \vdots \\ s_{p-1}^{(2)} \end{bmatrix}. \qquad (18)$$

Equation (14) can be solved using the same optimization and solutions that were described in the previous section. The optimal solution for $M^{(2)}$ for the least square problem is $$M^{(2)} = (S^{(2)T} S^{(2)})^{-1} S^{(2)T} V, \qquad (19)$$

where $S^{(2)T} S^{(2)}$ is now a 7×7 matrix.

Third order or higher MMR models can also be constructed in a similar way.

First Order Model with Cross-Product (MMR-1C)

In an alternative MMR model, the first order prediction model of equation (4) can be enhanced to incorporate cross-multiplications between the color components of each pixel, as in:

$$\hat{v}_i = sc_i \tilde{C}^{(1)} + s_i \tilde{M}^{(1)} + n \qquad (20)$$

where $\tilde{M}^{(1)}$ is a 3×3 matrix and n is a 1×3 vector, both as defined in equation (5), and.

$$\tilde{C}^{(1)} = \begin{bmatrix} mc_{11}^{(1)} & mc_{12}^{(1)} & mc_{13}^{(1)} \\ mc_{21}^{(1)} & mc_{22}^{(1)} & mc_{23}^{(1)} \\ mc_{31}^{(1)} & mc_{32}^{(1)} & mc_{33}^{(1)} \\ mc_{41}^{(1)} & mc_{42}^{(1)} & mc_{43}^{(1)} \end{bmatrix}, \text{ and} \qquad (21)$$

$$sc_i = [\, s_{i1} \cdot s_{i2} \quad s_{i1} \cdot s_{i3} \quad s_{i2} \cdot s_{i3} \quad s_{i1} \cdot s_{i2} \cdot s_{i3} \,].$$

Following the same approach as before, the MMR-1C model of equation (20) can be simplified by using a single prediction matrix MC, as in:

$$\hat{v}_i = sc_i^{(1)} \cdot MC^{(1)}, \qquad (22)$$

where $$MC^{(1)} = \begin{bmatrix} n \\ \tilde{M}^{(1)} \\ \tilde{C}^{(1)} \end{bmatrix} = \begin{bmatrix} n_{11} & n_{12} & n_{13} \\ m_{11}^{(1)} & m_{12}^{(1)} & m_{13}^{(1)} \\ m_{21}^{(1)} & m_{22}^{(1)} & m_{23}^{(1)} \\ m_{31}^{(1)} & m_{32}^{(1)} & m_{33}^{(1)} \\ mc_{11}^{(1)} & mc_{12}^{(1)} & mc_{13}^{(1)} \\ mc_{21}^{(1)} & mc_{22}^{(1)} & mc_{23}^{(1)} \\ mc_{31}^{(1)} & mc_{32}^{(1)} & mc_{33}^{(1)} \\ mc_{41}^{(1)} & mc_{42}^{(1)} & mc_{43}^{(1)} \end{bmatrix}, \text{ and} \qquad (23)$$

$$sc_i^{(1)} = [\, 1 \quad s_i \quad sc_i \,] \qquad (24)$$
$$= [\, 1 \quad s_{i1} \quad s_{i2} \quad s_{i3} \quad s_{i1} \cdot s_{i2} \quad s_{i1} \cdot s_{i3} \quad s_{i2} \cdot s_{i3} \quad s_{i1} \cdot s_{i2} \cdot s_{i3} \,].$$

By collecting all p pixels together, one may derive a simplified matrix expression, as in $$\hat{V} = SC \cdot MC^{(1)}, \qquad (25)$$

where $$\hat{V} = \begin{bmatrix} \hat{v}_0 \\ \hat{v}_1 \\ \vdots \\ \hat{v}_{p-1} \end{bmatrix} \text{ and } SC = \begin{bmatrix} sc_0^{(1)} \\ sc_1^{(1)} \\ \vdots \\ sc_{p-1}^{(1)} \end{bmatrix}. \qquad (26)$$

SC is a p×(1+7) matrix and equation (25) can be solved using the same least squares solution described earlier.

Second Order Model with Cross-Product (MMR-2C)

The first order MMR-1C model can be extended to include second order data as well. For example, $$\hat{v}_i = sc_i^2 \tilde{C}^{(2)} + s_i^2 \tilde{M}^{(2)} + sc_i \tilde{C}^{(1)} + s_i \tilde{M}^{(1)} + n, \qquad (27)$$

where $$\tilde{C}^{(2)} = \begin{bmatrix} mc_{11}^{(2)} & mc_{12}^{(2)} & mc_{13}^{(2)} \\ mc_{21}^{(2)} & mc_{22}^{(2)} & mc_{23}^{(2)} \\ mc_{31}^{(2)} & mc_{32}^{(2)} & mc_{33}^{(2)} \\ mc_{41}^{(2)} & mc_{42}^{(2)} & mc_{43}^{(2)} \end{bmatrix}, \qquad (28)$$

and $$sc_i^2 = [\, s_{i1}^2 \cdot s_{i2}^2 \quad s_{i1}^2 \cdot s_{i3}^2 \quad s_{i2}^2 \cdot s_{i3}^2 \quad s_{i1}^2 \cdot s_{i2}^2 \cdot s_{i3}^2 \,], \qquad (29)$$

and the remaining components of equation (27) are the same those defined before in equations (5-26).

As before, equation (27) can be simplified by using a simple prediction matrix $MC^{(2)}$, $$\hat{v}_i = sc_i^{(2)} MC^{(2)}, \tag{30}$$

where $$MC^{(2)} = \begin{bmatrix} n \\ \tilde{M}^{(1)} \\ \tilde{C}^{(1)} \\ \tilde{M}^{(2)} \\ \tilde{C}^{(2)} \end{bmatrix}$$

and $$sc_i^{(2)} = [1 \quad s_i \quad sc_i \quad s_i^2 \quad sc_i^2]. \tag{31}$$

By collecting all p pixels together, one may have a simplified matrix expression $$\hat{V} = SC^{(2)} \cdot MC^{(2)}, \tag{32}$$

where $$\hat{V} = \begin{bmatrix} \hat{v}_0 \\ \hat{v}_1 \\ \vdots \\ \hat{v}_{p-1} \end{bmatrix} \quad SC^{(2)} = \begin{bmatrix} sc_0^{(2)} \\ sc_1^{(2)} \\ \vdots \\ sc_{p-1}^{(2)} \end{bmatrix}, \tag{33}$$

and $SC^{(2)}$ is a px(1+2*7) matrix and one can apply the same least squares solutions as described before.

Third order or higher models with cross-product parameters can also be constructed in a similar way. Alternatively, as described in Chapter 5.4.3 of "*Digital Color Imaging Handbook*", CRC Press, 2002, Edited by Gaurav Sharma, a K-order representation of the MMR cross-product model can also be described using the following formulation:

$$\hat{v}_1 = \sum_{x=0}^{K} \sum_{y=0}^{K} \sum_{z=0}^{K} m_{1,x,y,z} s_1^x s_2^y s_3^z, \tag{34}$$

$$\hat{v}_2 = \sum_{x=0}^{K} \sum_{y=0}^{K} \sum_{z=0}^{K} m_{2,x,y,z} s_1^x s_2^y s_3^z, \tag{35}$$

and $$\hat{v}_3 = \sum_{x=0}^{K} \sum_{y=0}^{K} \sum_{z=0}^{K} m_{3,x,y,z} s_1^x s_2^y s_3^z, \tag{36}$$

where K denotes the highest order of the MMR predictor.

Spatial Extension Based on MMR (MMR-C-S)

In all of the MMR models described until now, the value of a predicted pixel $\hat{v}_i$ depends only on the corresponding, normally collocated, input values of $s_i$. Under MMR-based prediction, one may also benefit by taking into consideration data from neighbor pixels. This approach corresponds into integrating into the MMR model any linear-type of processing of the inputs in the spatial domain, such as FIR type filtering.

If in an image one considers all eight possible neighbor pixels, this approach may add up to eight more first-order variables per color component into our prediction matrix M. In practice however, it is usually adequate to only add prediction variables corresponding to the two horizontal and two vertical neighbor pixels, and ignore the diagonal neighbors. This will add up to four variables per color component into the prediction matrix, namely those corresponding to the top, left, bottom, and right pixels. Similarly, one can also add parameters corresponding to the higher order of neighbor's pixel values.

To simplify the complexity and computation requirements of such an MMR-spatial model, one may consider adding spatial extensions to the traditional models only for a single color component, such as the luminance component (as in a Luma-Chroma representation) or the Green component (as in an RGB representation). For example, assuming one adds spatial-based pixel prediction for the green only color component, from equations (34-36), a general expression for predicting a green output pixel value would be $$\hat{v}_g(i, j) = \sum_{x=0}^{K} \sum_{y=0}^{K} \sum_{z=0}^{K} m_{g,x,y,z} s_r^x(i, j) s_g^y(i, j) s_b^z(i, j) + \tag{37}$$

$$\sum_{x=\{-1,1\}} \sum_{y=\{-1,1\}} sm_{g,x,y} s_g(i+x, j+y).$$

First Order Model with Spatial-Extension (MMR-1-S)

As another example implementation, one may consider again the first order MMR model (MMR-1) of equation (4), but now enhanced to incorporate spatial extensions in one or more of the color components; For example, when applied to four neighbor pixels of each pixel in the first color component:

$$\hat{v}_i = sd_i \tilde{D}^{(1)} + s_i \tilde{M}^{(1)} + n, \tag{38}$$

where $\tilde{M}^{(1)}$ is a 3×3 matrix and n is a 1×3 vector, both as defined in equation (5), $$\tilde{D}^{(1)} = \begin{bmatrix} md_{11}^{(1)} & 0 & 0 \\ md_{21}^{(1)} & 0 & 0 \\ md_{31}^{(1)} & 0 & 0 \\ md_{41}^{(1)} & 0 & 0 \end{bmatrix}, \tag{39}$$

and $$sd_i = \lfloor s_{(i-1)1} \quad s_{(i+1)1} \quad s_{(i-m)1} \quad s_{(i+m)1} \rfloor$$

where m in equation (39) denotes the number of columns in an input frame with m columns and n rows, or m×n=p total pixels. Equation (39) can easily be extended to apply these methods to both other color components and alternative neighbor pixel configurations.

Following the same approaches as before, equation (38) can easily be formulated as a system of linear equations $$\hat{V} = SD \cdot MD^{(1)}, \tag{40}$$

which can be solved as described before.

Application to VDR Signals with More than Three Primary Colors

All of the proposed MMR prediction models can easily be extended to signal spaces with more than three primary colors. As an example, one may consider the case where an SDR signal has three primary colors, say RGB, but the VDR signal is defined in the P6 color space, with six primary colors. In this case, equations (1-3) can be re-written as $$s_i = [s_{i1} s_{i2} s_{i3}], \quad (41)$$

$$v_i = [v_{i1} v_{i2} v_{i3} v_{i4} v_{i5} v_{i6}], \quad (42)$$

and $$\hat{v}_i = [\hat{v}_{i1} \hat{v}_{i2} \hat{v}_{i3} \hat{v}_{i4} \hat{v}_{i5} \hat{v}_{i6}]. \quad (43)$$

As before, denote the number of pixels in one color component as p. Considering now the first order MMR prediction model (MMR-1) of equation (4), $$\hat{v}_i = s_i \tilde{M}^{(1)} + n \quad (44)$$

$\tilde{M}^{(1)}$ is now a 3×6 matrix and n is a 1×6 vector given by $$\tilde{M}^{(1)} = \begin{bmatrix} m_{11}^{(1)} & m_{12}^{(1)} & m_{13}^{(1)} & m_{14}^{(1)} & m_{15}^{(1)} & m_{16}^{(1)} \\ m_{21}^{(1)} & m_{22}^{(1)} & m_{23}^{(1)} & m_{24}^{(1)} & m_{25}^{(1)} & m_{26}^{(1)} \\ m_{31}^{(1)} & m_{32}^{(1)} & m_{33}^{(1)} & m_{34}^{(1)} & m_{35}^{(1)} & m_{36}^{(1)} \end{bmatrix}, \quad (45)$$

and $$n = [n_{11} \quad n_{12} \quad n_{13} \quad n_{14} \quad n_{15} \quad n_{16}]. \quad (46)$$

Equation (41) can be expressed using a single prediction matrix $M^{(1)}$ as $$\hat{v}_i = s_i' M^{(1)}, \quad (47)$$

where $$M^{(1)} = \begin{bmatrix} n_{11} & n_{12} & n_{13} & n_{14} & n_{15} & n_{16} \\ m_{11}^{(1)} & m_{12}^{(1)} & m_{13}^{(1)} & m_{14}^{(1)} & m_{15}^{(1)} & m_{16}^{(1)} \\ m_{21}^{(1)} & m_{22}^{(1)} & m_{23}^{(1)} & m_{24}^{(1)} & m_{25}^{(1)} & m_{26}^{(1)} \\ m_{31}^{(1)} & m_{32}^{(1)} & m_{33}^{(1)} & m_{34}^{(1)} & m_{35}^{(1)} & m_{36}^{(1)} \end{bmatrix}, \quad (48)$$

and $$s_i' = [1 \quad s_{i1} \quad s_{i2} \quad s_{i3}].$$

By collecting all p pixels together, this prediction problem can be described as $$\hat{V} = SM^{(1)}, \quad (49)$$

where $$\hat{V} = \begin{bmatrix} \hat{v}_0 \\ \hat{v}_1 \\ \vdots \\ \hat{v}_{p-1} \end{bmatrix}$$

is a p×6 matrix, $$S = \begin{bmatrix} s_0' \\ s_1' \\ \vdots \\ s_{p-1}' \end{bmatrix}$$

is a p×4 matrix, and $M^{(1)}$ is a 4×6 matrix.

The higher order MMR prediction models can also be extended in the similar fashion and the solutions for the prediction matrices can be obtained via the methods presented before.

Example Process for Multi-Channel, Multiple Regression Prediction

Figure 4:
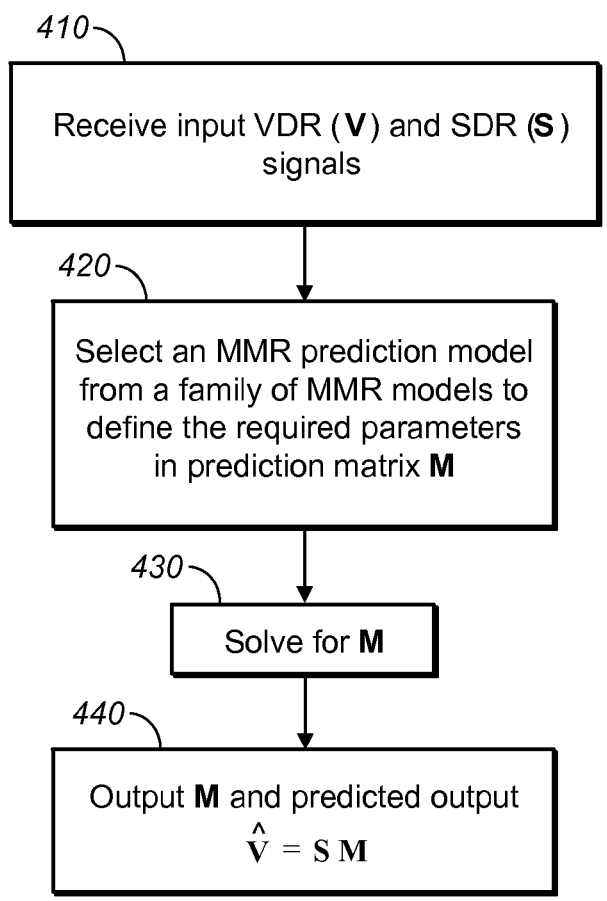
FIG. 4 depicts an example multivariate multi-regression prediction process according to an embodiment of the present invention.

FIG. 4 shows an example process for multi-channel multiple regression prediction according to an example implementation of our invention.

The process starts at step 410, wherein a predictor, such as predictor 250, receives the input VDR and SDR signals. Given the two inputs, in step 420, the predictor decides on which MMR model to select. As described before, the predictor can select among a variety of MMR models, including (but not necessarily limited to): first order (MMR-1), second order (MMR-2), third order or higher, first order with cross-product (MMR-1C), second order with cross product (MMR-2C), third order or higher with cross product, or any of the above models with added spatial extensions.

Figure 5:
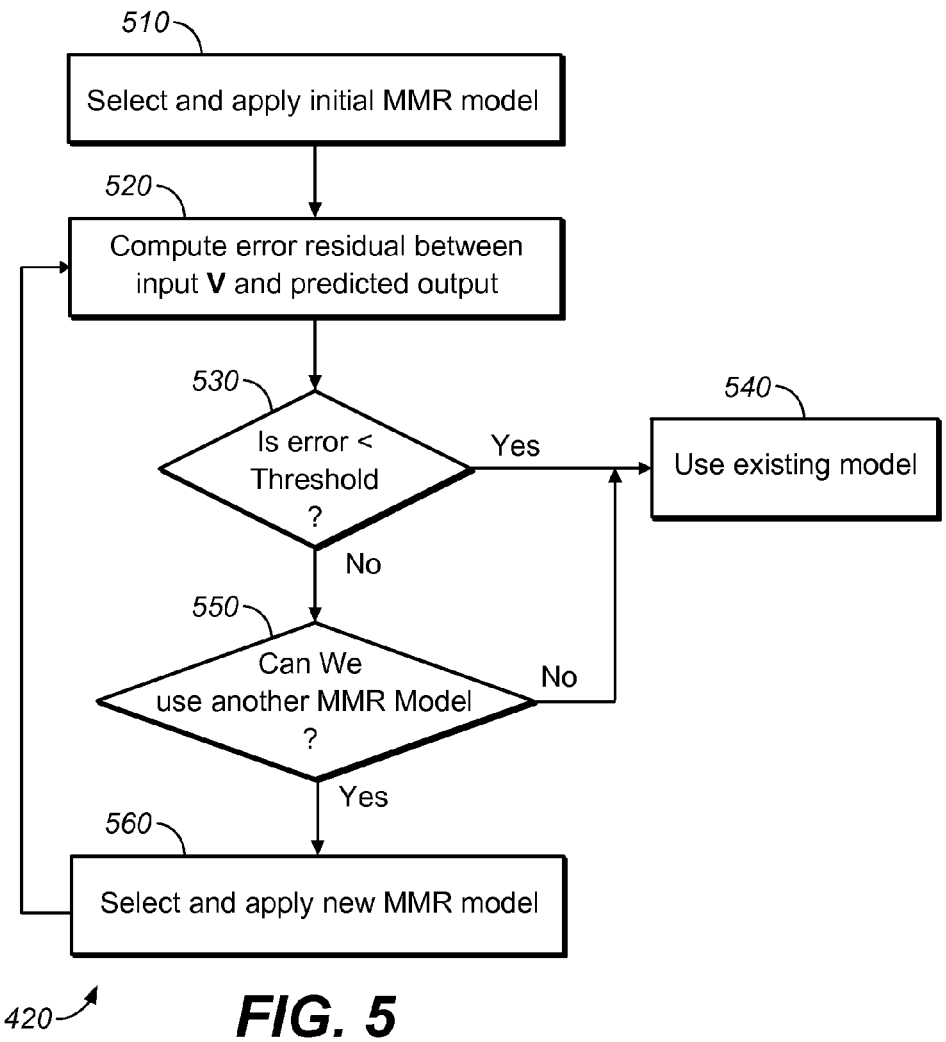
FIG. 5 depicts an example process on deciding on the model of a multivariate multi-regression predictor according to an embodiment of the present invention.

The selection of the MMR model can be done using a variety of methods that take into considerations a number of criteria, including: prior knowledge on the SDR and VDR inputs, available computational and memory resources, and target coding efficiency. FIG. 5 shows an example implementation of step 420 based on the requirement of the residual to be lower than a pre-determined threshold.

As described before, any MMR model can be represented a set of linear equations of the form $$\hat{V} = SM, \quad (50)$$

where M is a prediction matrix.

In step 430, M can be solved using a variety of numerical methods. For example, under the constrain to minimize the mean square of the residual between V and its estimate $\hat{V}$, $$M = (S^T S)^{-1} S^T V. \quad (51)$$

Finally, in step 440, using equation (50), the predictor outputs $\hat{V}$ and M.

FIG. 5 shows an example process 420 for selecting an MMR model during the prediction. Predictor 250 may start in step 510 with an initial MMR model, such as the one that has been used in a prior frame or scene, for example the second-order model (MMR-2), or the simplest possible model, such as MMR-1. After solving for M, in step 520 the predictor computes the prediction error between input V and its predicted value. In step 530, if the prediction error is lower than a given threshold, then the predictor selects the existing model and stops the selection process (540), otherwise, in step 550, investigates whether to use a more complex model. For example, if the current model is MMR-2, the predictor may decide to use MMR-2-C or MMR-2-C-S. As described before, this decision may depend on a variety of criteria, including the value of the prediction error, processing power requirements, and target coding efficiency. If it is feasible to use a more complex model, a new model is selected in step 560 and the process returns back to step 520. Otherwise, the predictor will use the existing model (540).

Prediction process 400 can be repeated at a variety of intervals as deemed necessary to maintain coding efficiency while using available computing resources. For example, when coding video signals, process 400 can be repeated on a per predefined video slice size basis, for each frame, a group of frames, or whenever the prediction residual exceeds a particular threshold.

Prediction process 400 can also use all available input pixels or a sub-sample of those pixels. In one example implementation, one may use pixels only from every k-th pixel row and every k-th pixel column of the input data, where k is an integer equal or higher than two. In another example implementation one may decide to skip input pixels that are below a certain clipping threshold (for example, very close to zero)

or pixels that are above a certain saturation threshold (for example, for n-bit data, pixel values that are very close to $2^n-1$.) In yet another implementation, one may use a combination of such subsampling and thresholding techniques in order to reduce the pixel sample size and accommodate the computational constrains of a particular implementation.

Image Decoding

Figure 6:
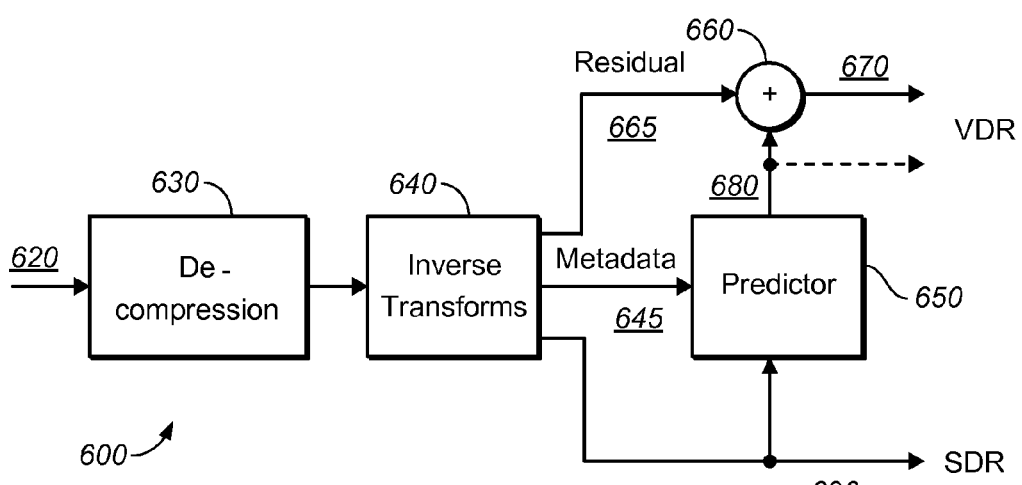
FIG. 6 depicts an example image decoder with a predictor operating according to the embodiments of this invention.

Embodiments of the present invention may be implemented either on an image encoder or an image decoder. FIG. 6 shows an example implementation of decoder 150 according to an embodiment of this invention.

Decoding system 600 receives a coded bitstream that may combine a base layer 690, an optional enhancement layer (or residual) 665, and metadata 645, which are extracted following decompression 630 and miscellaneous inverse transforms 640. For example, in a VDR-SDR system, the base layer 690 may represent the SDR representation of the coded signal and the metadata 645 may include information about the MMR prediction model that was used in the encoder predictor 250 and the corresponding prediction parameters. In one example implementation, when the encoder uses an MMR predictor according to the methods of this invention, metadata may include the identification of the model being used (for example, MMR-1, MMR-2, MMR-2C, and the like) and all matrix coefficients associated with that specific model. Given base layer 690 s and the color MMR-related parameters extracted from the metadata 645, predictor 650 can compute predicted $\hat{V}$ 680 using any of the corresponding equation described herein. For example, if the identified model is MMR-2C, then $\hat{V}$ 680 can be computed using equation (32). If there is no residual, or the residual is negligible, the predicted value 680 can be output directly as the final VDR image. Otherwise, in adder 660, the output of the predictor (680) is added to the residual 665 to output VDR signal 670.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to MMR-based prediction, such as those described herein. The computer and/or IC may compute, any of a variety of parameters or values that relate to the MMR prediction as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement MMR-based prediction methods as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to applying MMR prediction in coding VDR and SDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
providing a variety of multi-channel, multiple-regression (MMR) prediction models, each MMR prediction model adapted to approximate an image having a first dynamic range in terms of
an image having a second dynamic range, and
prediction parameters of the respective MMR prediction model, by applying inter-color image prediction;
receiving a first image and a second image, wherein the second image has a different dynamic range than the first image;
selecting a multi-channel, multiple-regression (MMR) prediction model from the variety of MMR models;
determining values of the prediction parameters of the selected MMR model;
computing an output image approximating the first image based on the second image and the determined values of the prediction parameters applied to the selected MMR prediction model;
outputting the determined values of the prediction parameters and the computed output image, wherein the variety of MMR models includes a first order multi-channel, multiple regression prediction model incorporating cross-multiplications between the color components of each pixel according to the formula $$\hat{v}_i = sc_i \tilde{C}^{(1)} + s_p \tilde{M}^{(1)} + n$$

wherein
$\hat{v}_i = [\hat{v}_{i1}\ \hat{v}_{i2}\ \hat{v}_{i3}]$ denotes the predicted three color components of the i-th pixel of the first image, $s_i=[s_{i1}\ s_{i2}\ s_{i3}]$ denotes the three color components of the i-th pixel of the second image,
$\tilde{M}^{(1)}$ is a 3×3 matrix and n is a 1×3 vector according to $$\tilde{M}^{(1)} = \begin{bmatrix} m_{11}^{(1)} & m_{12}^{(1)} & m_{13}^{(1)} \\ m_{21}^{(1)} & m_{22}^{(1)} & m_{23}^{(1)} \\ m_{31}^{(1)} & m_{32}^{(1)} & m_{33}^{(1)} \end{bmatrix},$$

and $$n = [n_{11}\ n_{12}\ n_{13}],$$

$$sc_i = [s_{i1} \cdot s_{i2}\ \ s_{i1} \cdot s_{i3}\ \ s_{i2} \cdot s_{i3}\ \ s_{i1} \cdot s_{i2} \cdot s_{i3}],$$

and $$\tilde{C}^{(1)} = \begin{bmatrix} mc_{11}^{(1)} & mc_{12}^{(1)} & mc_{13}^{(1)} \\ mc_{21}^{(1)} & mc_{22}^{(1)} & mc_{23}^{(1)} \\ mc_{31}^{(1)} & mc_{32}^{(1)} & mc_{33}^{(1)} \\ mc_{41}^{(1)} & mc_{42}^{(1)} & mc_{43}^{(1)} \end{bmatrix},$$

wherein the prediction parameters of said first order multi-channel, multiple regression prediction model are numerically obtained by minimizing the mean square error between the first image and the output image.

2. The method of claim 1 wherein the first image comprises a VDR image and the second image comprises an SDR image.

3. The method of claim 1 wherein the selected MMR prediction model is at least one of: a first order MMR model, a third order MMR model, a second order with cross-product MMR model, or a third order with cross-product MMR model.

4. The method of claim 3 wherein any of the MMR models further comprises prediction parameters related to neighbor pixels of the i-th pixel.

5. The method of claim 4 wherein the neighbor pixels comprise the left neighbor pixel, the right neighbor pixel, the top neighbor pixel, and the bottom neighbor pixel of the i-th pixel.

6. The method of claim 2, wherein pixels in the VDR image have more color components than the pixels in the SDR image.

7. The method of claim 1 wherein selecting the MMR prediction model from the variety of MMR prediction models further comprises an iterative selection process comprising:
(a) selecting and applying an initial MMR prediction model;
(b) computing a residual error between the first image and the output image;
(c) selecting the initial MMR model if the residual error is smaller than an error threshold and no further MMR prediction model is selectable; otherwise,
selecting a new MMR prediction model from the variety of MMR prediction models, the new MMR prediction model being different from the previously selected MMR prediction model; and returning to step (b).

8. An image decoding method comprising:
receiving a first image having a first dynamic range;
receiving metadata, wherein said metadata include
a multiple-regression (MMR) prediction model adapted to approximate a second image having a second dynamic range in terms of the first image, and
prediction parameters of the MMR prediction model, by applying inter-color image prediction, the metadata further including previously determined values of the prediction parameters; and
applying the first image and the previously determined values of the prediction parameters to the MMR prediction model to compute an output image for approximating the second image, wherein the second dynamic range is different from the first dynamic range, wherein the MMR prediction model is a first order multi-channel, multiple regression prediction model incorporating cross-multiplications between the color components of each pixel according to the formula $$\hat{v}_i = sc_i \tilde{C}^{(1)} + s_i \tilde{M}^{(1)} + n$$

wherein
$\hat{v}_i=[\hat{v}_{i1}\ \hat{v}_{i2}\ \hat{v}_{i3}]$ denotes the predicted three color components of the i-th pixel of the first image,
$s_i=[s_{i1}\ s_{i2}\ s_{i3}]$ denotes the three color components of the i-th pixel of the second image,
$\tilde{M}^{(1)}$ is a 3×3 matrix and n is a 1×3 vector according to $$\tilde{M}^{(1)} = \begin{bmatrix} m_{11}^{(1)} & m_{12}^{(1)} & m_{13}^{(1)} \\ m_{21}^{(1)} & m_{22}^{(1)} & m_{23}^{(1)} \\ m_{31}^{(1)} & m_{32}^{(1)} & m_{33}^{(1)} \end{bmatrix},$$

and $$n = [n_{11}\ n_{12}\ n_{13}],$$

$$sc_i = [s_{i1} \cdot s_{i2}\ \ s_{i1} \cdot s_{i3}\ \ s_{i2} \cdot s_{i3}\ \ s_{i1} \cdot s_{i2} \cdot s_{i3}],$$

and $$\tilde{C}^{(1)} = \begin{bmatrix} mc_{11}^{(1)} & mc_{12}^{(1)} & mc_{13}^{(1)} \\ mc_{21}^{(1)} & mc_{22}^{(1)} & mc_{23}^{(1)} \\ mc_{31}^{(1)} & mc_{32}^{(1)} & mc_{33}^{(1)} \\ mc_{41}^{(1)} & mc_{42}^{(1)} & mc_{43}^{(1)} \end{bmatrix}.$$

9. The method of claim 8 wherein said first order MMR prediction model is expanded to a second or third order MMR prediction model with cross-pixel multiplications.

10. The method of claim 8 or 9 wherein the MMR prediction model further comprises prediction parameters related to neighbor pixels of the i-th pixel.

11. The method of claim 8 wherein the first image comprises an SDR image and the second image comprises a VDR image.

12. A method comprising:
providing a variety of multi-channel, multiple-regression (MMR) prediction models, each MMR prediction model adapted to approximate an image having a first dynamic range in terms of
an image having a second dynamic range, and
prediction parameters of the respective MMR prediction model, by applying inter-color image prediction;
receiving a first image and a second image, wherein the second image has a different dynamic range than the first image;
selecting a multi-channel, multiple-regression (MMR) prediction model from the variety of MMR models;
determining values of the prediction parameters of the selected MMR model;
computing an output image approximating the first image based on the second image and the determined values of the prediction parameters applied to the selected MMR prediction model;

outputting the determined values of the prediction parameters and the computed output image, wherein the variety of MMR models includes a second order multichannel, multiple regression prediction according to the formula $$\hat{v}_i = s_i^2 \tilde{M}^{(2)} + s_i \tilde{M}^{(1)} + n$$

wherein
$\hat{v}_i = [\hat{v}_{i1}\ \hat{v}_{i2}\ \hat{v}_{i3}]$ denotes the predicted three color components of the i-th pixel of the first image,
$s_i = [s_{i1}\ s_{i2}\ s_{i3}]$ denotes the three color components of the i-th pixel of the second image,
$\tilde{M}^{(1)}$ and $\tilde{M}^{(2)}$ is a 3×3 matrix and n is a 1×3 vector according to:

$$\tilde{M}^{(1)} = \begin{bmatrix} m_{11}^{(1)} & m_{12}^{(1)} & m_{13}^{(1)} \\ m_{21}^{(1)} & m_{22}^{(1)} & m_{23}^{(1)} \\ m_{31}^{(1)} & m_{32}^{(1)} & m_{33}^{(1)} \end{bmatrix},$$

$$n = [n_{11}\ n_{12}\ n_{13}],$$

$$\tilde{M}^{(2)} = \begin{bmatrix} m_{11}^{(2)} & m_{12}^{(2)} & m_{13}^{(2)} \\ m_{21}^{(2)} & m_{22}^{(2)} & m_{23}^{(2)} \\ m_{31}^{(2)} & m_{32}^{(2)} & m_{33}^{(2)} \end{bmatrix},$$

and $$s_i^2 = [s_{i1}^2\ s_{i2}^2\ s_{i3}^2],$$

wherein the prediction parameters of said second order multichannel, multiple regression prediction model are numerically obtained by minimizing the mean square error between the first image and the output image.

13. The method of claim 12 wherein any of the MMR models further comprises prediction parameters related to neighbor pixels of the i-th pixel.

14. The method of claim 13 wherein the neighbor pixels comprise the left neighbor pixel, the right neighbor pixel, the top neighbor pixel, and the bottom neighbor pixel of the i-th pixel.

15. The method of claim 12 wherein selecting the MMR prediction model from the variety of MMR prediction models further comprises an iterative selection process comprising:
(a) selecting and applying an initial MMR prediction model;
(b) computing a residual error between the first image and the output image;
(c) selecting the initial MMR model if the residual error is smaller than an error threshold and no further MMR prediction model is selectable; otherwise, selecting a new MMR prediction model from the variety of MMR prediction models, the new MMR prediction model being different from the previously selected MMR prediction model; and returning to step (b).

16. An image decoding method comprising:
receiving a first image having a first dynamic range;
receiving metadata, wherein said metadata include
a multiple-regression (MMR) prediction model adapted to approximate a second image having a second dynamic range in terms of
the first image, and
prediction parameters of the MMR prediction model, by applying inter-color image prediction, the metadata further including previously determined values of the prediction parameters; and
applying the first image and the previously determined values of the prediction parameters to the MMR prediction model to compute an output image for approximating the second image, wherein the second dynamic range is different from the first dynamic range, wherein the MMR prediction model is a second order multichannel, multiple regression prediction according to the formula $$\hat{v}_i = s_i^2 \tilde{M}^{(2)} + s_i \tilde{M}^{(1)} + n$$

wherein
$\hat{v}_i = [\hat{v}_{i1}\ \hat{v}_{i2}\ \hat{v}_{i3}]$ denotes the predicted three color components of the i-th pixel of the second image,
$s_i = [s_{i1}\ s_{i2}\ s_{i3}]$ denotes the three color components of the i-th pixel of the first image,
$\tilde{M}^{(1)}$ and $\tilde{M}^{(2)}$ is a 3×3 matrix and n is a 1×3 vector according to:

$$\tilde{M}^{(1)} = \begin{bmatrix} m_{11}^{(1)} & m_{12}^{(1)} & m_{13}^{(1)} \\ m_{21}^{(1)} & m_{22}^{(1)} & m_{23}^{(1)} \\ m_{31}^{(1)} & m_{32}^{(1)} & m_{33}^{(1)} \end{bmatrix},$$

$$n = [n_{11}\ n_{12}\ n_{13}],$$

$$\tilde{M}^{(2)} = \begin{bmatrix} m_{11}^{(2)} & m_{12}^{(2)} & m_{13}^{(2)} \\ m_{21}^{(2)} & m_{22}^{(2)} & m_{23}^{(2)} \\ m_{31}^{(2)} & m_{32}^{(2)} & m_{33}^{(2)} \end{bmatrix},$$

and $$s_i^2 = [s_{i1}^2\ s_{i2}^2\ s_{i3}^2],$$

wherein the prediction parameters of said second order multichannel, multiple regression prediction model are numerically obtained by minimizing the mean square error between the first image and the output image.

17. The method of claim 16 wherein said second order MMR prediction model is expanded to a second or third order MMR prediction model with cross-pixel multiplications.

18. The method of claim 16 or 17 wherein the MMR prediction model further comprises prediction parameters related to neighbor pixels of the i-th pixel.

19. An apparatus comprising a processor and configured to perform any one of the methods recited in claim 1, 8, 12, or 16.

20. A non-transitory computer-readable storage medium having stored thereon computer-executable instructions for executing a method using at least a processor in accordance with any one of claim 1, 8, 12, or 16.

* * * * *